May 20, 1930.  A. E. KNESS  1,758,952
ANIMAL TRAP
Filed Nov. 19, 1927   2 Sheets-Sheet 1

Inventor
A. E. Kness,
By Clarence A. O'Brien
Attorney

Patented May 20, 1930

1,758,952

UNITED STATES PATENT OFFICE

AUSTIN ENOS KNESS, OF AUDUBON, IOWA, ASSIGNOR TO CLARA KNESS, OF AUDUBON, IOWA

ANIMAL TRAP

Application filed November 19, 1927. Serial No. 234,481.

This invention relates to new and useful improvements in animal traps and aims to provide a highly novel, simple and efficient trap falling within the general classification of the ever set mechanism. By this is meant a trap that will operate efficiently in the catching of rats, mice and the like rodents without requiring the resetting of the same at each operation of the trap and without necessitating the frequent rebaiting of the trap.

In carrying out the present invention there is provided generally a housing having means whereby rats, mice and the like may enter therein, said housing being further equipped with means for dividing the same into two compartments one compartment being provided for the reception of bait visible to the animals after passing into the housing, but being separated therefrom by a wall arranged within the housing. Furthermore means is provided for automatically releasing a rotating mechanism within the center of the housing for striking the animals and throwing them into the other compartments where they are retained fully alive until the trap is empty. Thus there is provided a trap that is humane in its nature and that is positive in its operation and that is so constructed as to overcome any possibility of the rodents escaping therefrom after once being trapped therein.

In the drawings wherein like reference characters indicate corresponding parts throughout the same:

Figure 4:
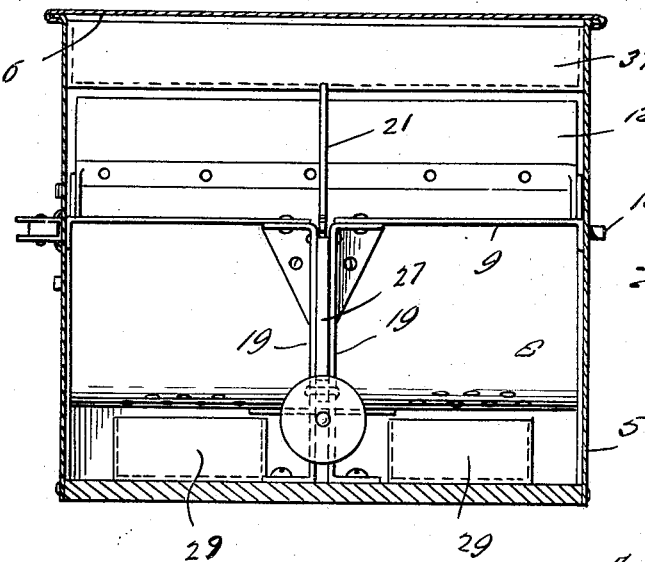
Figure 4 is a vertical section taken substantially upon the line 4—4 of Figure 2 and looking in the direction of the arrows.

Now having particular reference to the drawings, my novel trap consists of a housing 5 preferably of rectangular shape and having a removable top wall 6 that is preferably longitudinally slidably associated with the side walls as indicated in Figure 4, the opposite side walls of this housing 5 are formed substantially centrally of the housing and adjacent the bottom thereof with animal entrance openings 7—7, the lower edges of which at least describe segments of circles. Arranged transversely within the housing 5 is a wall or platform 8 that extends from the lower ends of the lower edges of the openings 7—7 directly in alinement with said edges and toward the end of the housing remote from said lower ends of the lower edges of the openings as clearly indicated in Figure 2. This wall or platform 8 also describes an arc of a circle and is of much greater length than the length of the lower edges of said opening, the upper edge of this wall 8 terminating substantially centrally of the housing as also indicated in Figure 2 from which point the material forming said wall or platform is bent toward the adjacent end of the housing to form a horizontal wall 9.

Arranged transversely within the housing 5 is a rotating unit designated generally by the reference character 10. This rotating unit consists of a pair of circular end plates or discs 11—11 between which are arranged and secured tangentially extending walls or wings 12, the inner edges of which are bent at an angle outwardly and that are attached at said outwardly bent edges to the next adjacent wall or wing as disclosed in Figure 2. The mounting means for this rotating unit consists of a shaft 13 that is engaged through the space surrounded by the walls or wings 12 and through the centers of the end plates or discs 11, the opposite ends of said shaft being loosely arranged through openings in the side walls of the housing 5.

Figure 2:
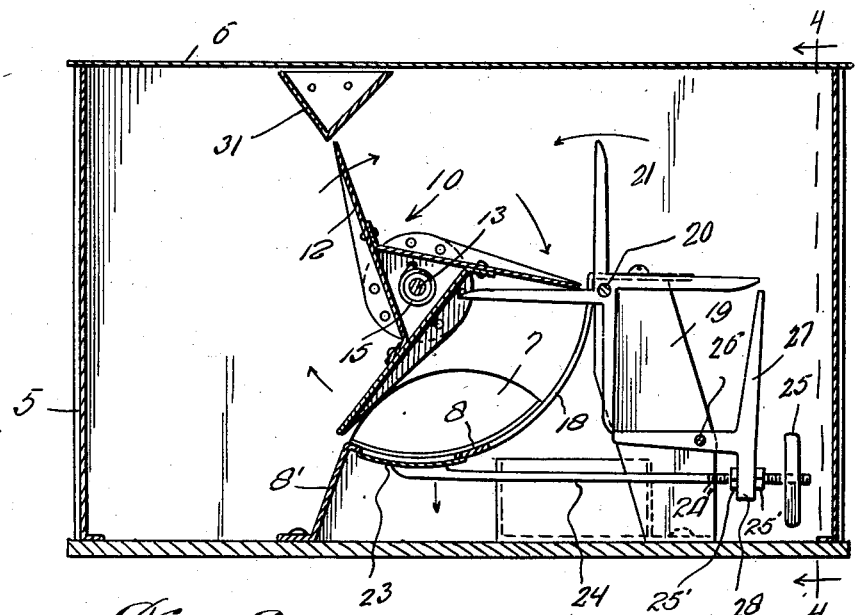
Figure 2 is a detail longitudinal section.

The disposition of the rotating unit with respect to the curved wall or platform 8 within the housing as well as the width of the plates or wings 12 of said rotating unit is such that when the unit rotates in the direction of arrows in Figure 2 the outer edges of said plates or wings will have slight spaced engagement with the curved wall so as to permit of the free rotation of the unit without encountering said wall or platform.

Surrounding the shaft 13 is a normally expanded coil spring 15 secured at one end to the shaft and at the opposite end to the adjacent plate or disc 11 of said rotating unit.

Figure 1:
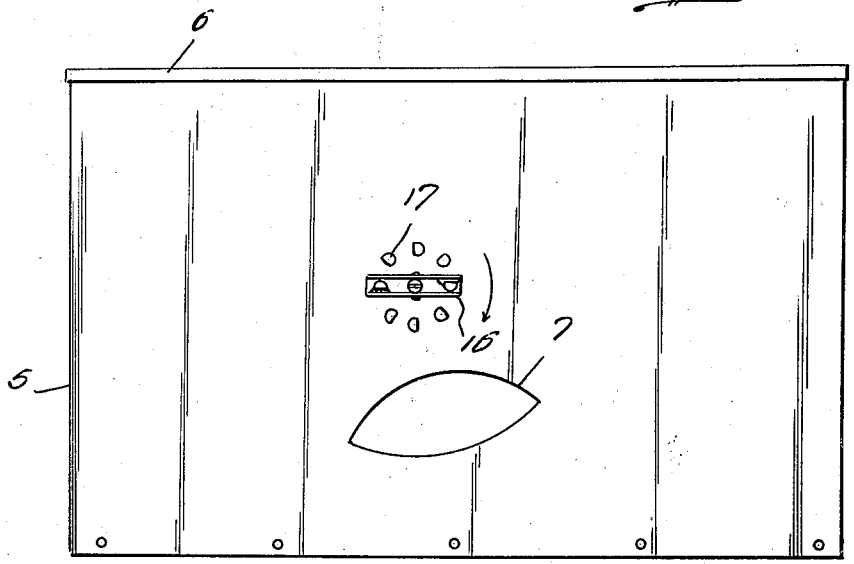
Figure 1 is a side elevation of my improved device.

One projecting end of this shaft 13 is provided with a turning key 16, while between this key and the adjacent wall of the housing 5 is complementary construction designated generally by the reference character 17 to prevent the turning of the shaft 13 in a reverse direction after the spring has been wound by turning the key in the direction of the arrow in Figure 1.

Figure 3:
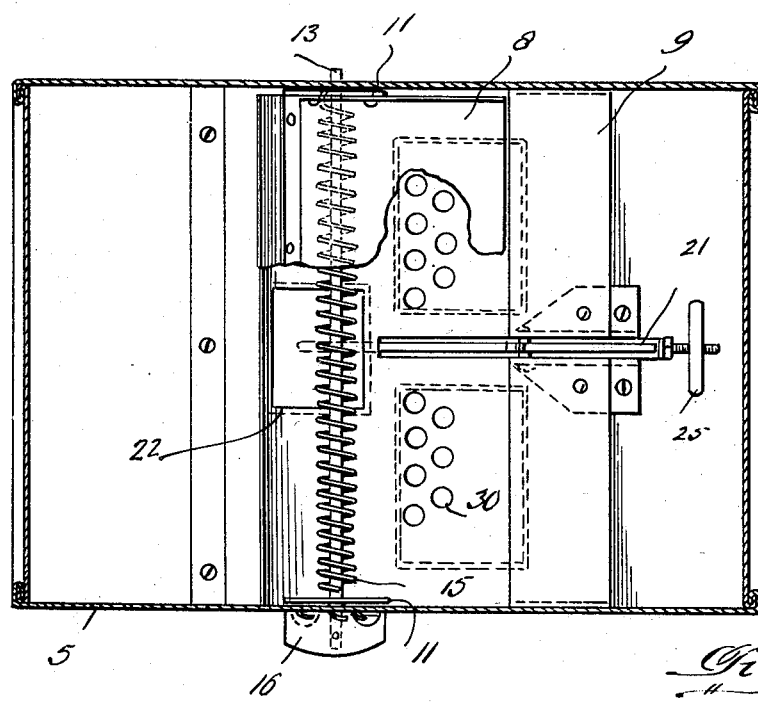
Figure 3 is a detail horizontal section.

The lower edge of the curved wall or platform 8 is provided with a down turned portion 8', the lower edge of which is secured to the bottom wall of the housing 5 as indicated in Figures 2 and 3. Extending from a point adjacent the lower end of the curved wall or platform 8 and at the center thereof and extending upwardly is a slot 18 which continues through the horizontal portion of said wall as disclosed in Figures 3 and 4. Depending from the horizontal portion 9 of the wall or platform at opposite edges of the slot 18 are relatively narrow walls 19—19 secured at their upper ends to the wall 9 and at their lower ends to the bottom wall of the housing, which walls serve to support the curved wall or platform within the housing as is obvious from a consideration of Figure 4.

Mounted upon a transverse pivot 20 extending between the walls 19—19 at the upper and inner corners thereof directly in back of the slot 18 is a four-armed latch member 21 the arms of which are adapted for free movement through the slot 18 in the curved platform 8 as well as the horizontal portion 9 thereof.

At the center of the curved platform 8 adjacent the lower edge thereof is an elongated opening 22, while directly beneath said opening is an animal weight controlled trip plate 23 that is arranged upon the inner end of an arm 24 extending between the previously mentioned vertical walls 19—19, the outer end of said arm being provided with a counter weight 25. Pivoted between the walls 19—19 as at 26 is the lower horizontal arm of an L-shaped lever 27, the other arm of which extends vertically as disclosed in Figure 2. At the juncture between the arms of this lever there is formed a depending tongue 28 adapted for adjustable connection to the previously mentioned arm 24, by disposing the threaded end portion 24' of the arm through an opening in said tongue 28 and securing the said tongue against displacement by jamb nuts 25' engaging opposite sides of the same and being threadedly engaged on the said arm. The relative position of the lever 27 and the rotating trip member 21 is such that when the animal weight controlled plate 23 is in engagement with the curved platform 8 the perpendicular arm of the member 21 between the walls 19—19 will abut the inner end of the horizontal arm of the lever 27 to prevent rotation of said member 21, thereby locking the spring controlled unit 10 against rotation.

Bait boxes 29—29 are arranged within the housing 5 beneath the curved platform 8, the same being visible through openings 30 in the curved platform. Obviously when an animal passes into the housing through the openings 7 in the side walls thereof and attempts to gain access to the bait within the boxes 29, said animals will under ordinary circumstances walk upon the trip plate 23 causing the rocking of the arm 24 and the consequent rocking of the lever 27 causing the disengagement of the horizontal arm of said lever from the arm of the rotating member 21 whereupon by the action of the coiled spring 15 the rotating unit 10 will move in the direction of the arrows causing the plate or wall of the rotating unit that has had engagement with the inwardly extending horizontal arm of the unit 21 to strike the animal forcing it into the housing at the end thereof remote from the lever 27.

Obviously the movement of the rotating unit 10 will cause the reverse rotation of the unit 21 for bringing the upwardly projecting arm of the unit 21 into position above the platform 8 so as to engage beneath the next wall or wing 12 of said rotating unit. To prevent the spinning of the unit 21 when the same is released by the lever 27 the vertically extending arm of this lever moving inwardly when the lever is rocked will engage the arm of the unit 21 that has just been released from the horizontal arm of said lever 27 for obviously checking the rotation of said unit 21 until the downcoming arm of the unit engages the inner end of the horizontal arm of said lever 27. This will also prevent the ends of the arms of the unit 21 and the edges of the plate or wings of the unit 10 from becoming wedged together, which would of course interfere with the proper operation of the trap.

In order to prevent passage of the animals across the top of the rotating unit 10 there is arranged between the sidewalls of the housing 5 at the top side thereof a V-shaped wall 31, the apex of which will have but slight spaced relation from the upwardly extending wall or wing of the rotating unit 10 when the trap is set for the next operation.

Having thus described the invention, what I claim as new and desire to secure by Letters Patent is:—

1. An animal trap comprising a housing having an entrance opening in one side wall thereof, a trip plate mounted within said housing, a rotatable unit mounted within the housing and above said plate, means tending to spin the unit in one direction, said unit including a plurality of radiating blades, a latch mechanism for holding the unit in a set position, said latch mechanism comprising a plurality of radiating arms, said arms being adapted for successive engagement with the blades of the unit, and a pawl consisting of a pair of angularly connected legs, a connection between the pawl and the trip plate whereby the pawl may be actuated to cause the disengagement of one leg thereof from one of the arms, while the other leg is adapted to act as a stop for said arm to permit only a partial revolution of the unit.

2. An animal trap comprising a housing having an entrance opening in one side wall thereof, a trip plate mounted within said housing, a rotatable unit mounted within the housing and above said platform, means tending to spin the unit in one direction, said unit including a plurality of radiating blades, a latch mechanism for holding the unit in a set position, said latch mechanism comprising a plurality of radiating arms, said arms being adapted for successive engagement with the blades of the unit, and a pawl consisting of a pair of angularly connected legs, a connection between the pawl and the trip plate whereby the pawl may be actuated to cause the disengagement of one leg thereof from one of the arms, while the other leg is adapted to act as a stop for said arm to permit only a partial revolution of the unit, and adjustment means on said connector whereby the load capacity of the trip plate at which the pawl will operate may be varied.

3. An animal trap comprising a housing having an entrance opening in one side wall thereof, a trip plate mounted within said housing, a rotatable unit mounted within the housing and above said plate, means tending to spin the unit in one direction, said unit including a plurality of radiating blades, a latch mechanism for holding the unit in a set position, said latch mechanism comprising a plurality of radiating arms, said arms being adapted for successive engagement with the blades of the unit, and a pawl consisting of a pair of angularly connected legs, a connection between the pawl and the trip plate whereby the pawl may be actuated to cause the disengagement of one leg thereof from one of the arms, while the other leg is adapted to act as a stop for said arm to permit only a partial revolution of the unit, and adjustment means on said connector whereby the load capacity of the trip plate at which the pawl will operate may be varied, said means consisting of a weight member threadedly engaged on the end of the connection remote from the trip plate.

In testimony whereof I affix my signature.

AUSTIN ENOS KNESS.